No. 698,523. Patented Apr. 29, 1902.
J. W. KOHLHEPP & A. J. FRANCIS.
MACHINE FOR LACERATING OR SLITTING ENTRAILS.
(Application filed July 18, 1900.)
(No Model.)
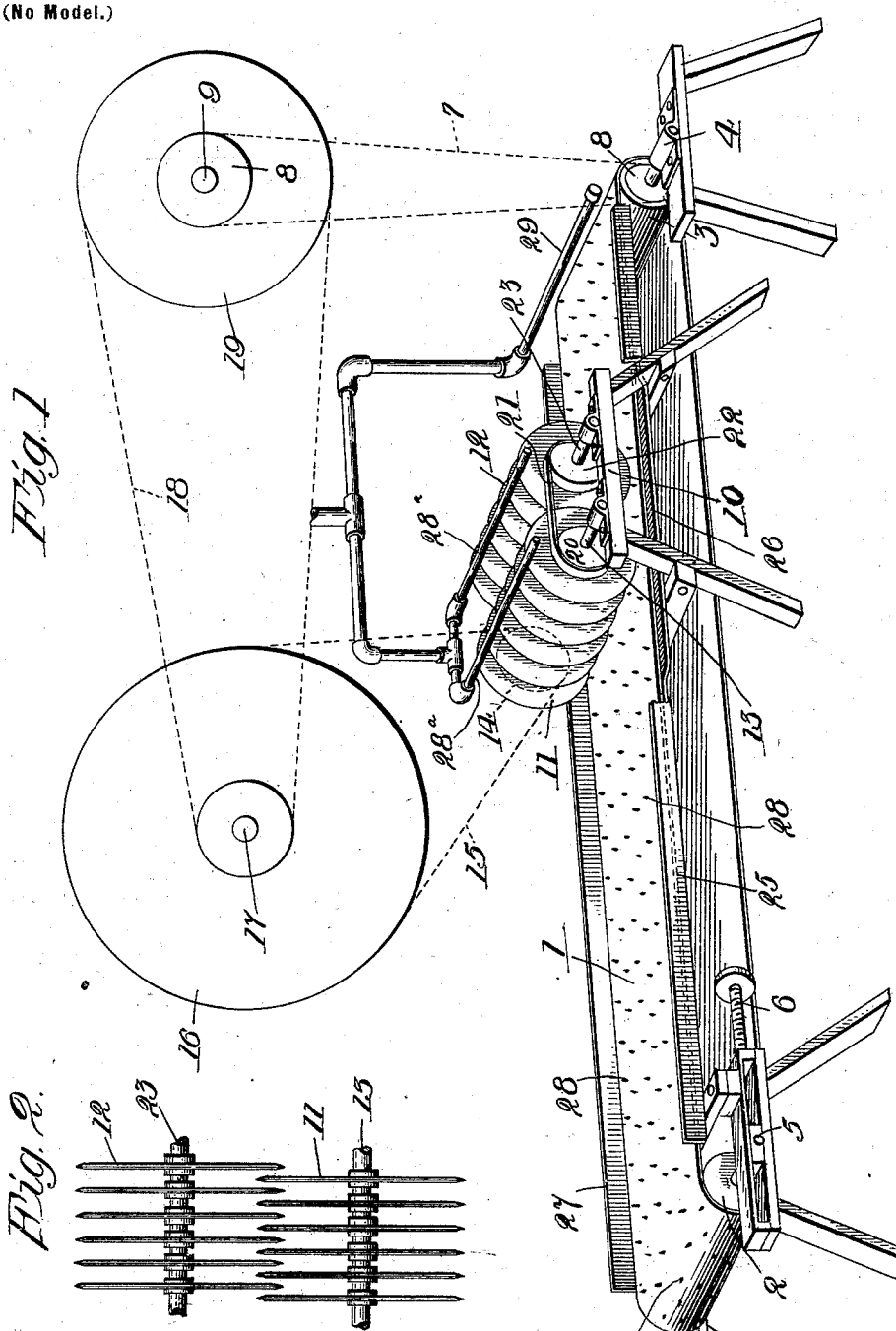
Witnesses:
Inventors
John W. Kohlhepp
Albert J. Francis
By Elliott & Hopkins
Attys

UNITED STATES PATENT OFFICE.

JOHN W. KOHLHEPP AND ALBERT J. FRANCIS, OF CHICAGO, ILLINOIS.

MACHINE FOR LACERATING OR SLITTING ENTRAILS.

SPECIFICATION forming part of Letters Patent No. 698,523, dated April 29, 1902.

Application filed July 18, 1900. Serial No. 24,002. (No model.)

*To all whom it may concern:*

Be it known that we, JOHN W. KOHLHEPP and ALBERT J. FRANCIS, citizens of the United States, residing at Chicago, in the county of Cook and State of Illinois, have invented certain new and useful Improvements in Machines for Lacerating or Slitting Entrails, of which the following is a full, clear, and exact specification.

Our invention relates more especially to means for lacerating or slitting the entrails of hogs and other beasts, particularly the large or coiled entrails, for the purpose of dislodging the objectionable contents thereof, and making the fat and other useful portions available; and the invention has for its primary object to provide means for readily slitting the entrails through one side, so as to dislodge the contents without mutilating the other side to a degree destroying the integral character of the entrail.

With these ends in view our invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a perspective view of our improved machine, and Fig. 2 is a plan view of the knives.

1 represents an endless belt or apron running over drums 2 3, journaled in suitable bearings 4 5, the latter of which is made adjustable by screw 6, so that the belt 1 may be made desirably tight. The belt 1 is drawn continuously by suitable chain 7 or other driving connection engaging sprocket or gear 8 on drum 3 and driving power from countershaft 9.

Arranged over belt or apron 1 and journaled in a suitable frame 10 are two series of circular cutters or knives 11 12, the shaft 13 of one of which series is provided with gear or sprocket 14, driven by chain belt or other suitable connection 15 from pulley 16 on main driving-shaft 17, connected by belt 18 with pulley 19 on shaft 9. The shaft 13 is provided with gear or sprocket 20, connected by chain or belt 21 with a sprocket 22 on shaft 23 of the other series 12 of knives, so that both series will rotate in the same direction and in the same direction as the movement of the upper fold of belt or apron 1, but at a much greater rate of speed. The edges of the knives 11 12 come very close to without touching the belt 1, and their province is to lacerate or slit the entrail 24 as the same is carried thereunder by the belt.

The entrails for which this machine is more especially designed for cutting is that portion known as the "black" or "large" entrail, which grows in a coil similar to a coiled rope or snake, with the convolutions knitted together by fat membrane. This fat and other valuable portions may be recovered if separated from the objectionable contents, and the latter may readily be dislodged and the interior cleaned by cutting incisions through and crosswise of the convolutions on one side without destroying the integral character of the entrail as a whole.

Owing to the presence of large stones, barbed wire, nails, and other like indigestibles frequently found in the entrails of hogs, it is necessary to arrange the knives a considerable distance apart, so that a stone or other foreign solid substance may slip to one side and pass between them without damaging their edges; but in order that the slits may be sufficiently close together the knives of one series are arranged between or staggered with reference to those of the other series.

To better induce the travel of the entrail with the belt 1, the latter may be provided at suitable intervals with points or pins 28, arranged so as to pass between the knives.

Arranged under the belt or apron 1 is a table 25, whose function is to hold the upper fold thereof in a horizontal position and keep the same from sagging under the knives; but in order that the belt may yield slightly under the knives should the latter encounter some solid object the table 25 is depressed, as shown at 26.

Arranged along each side of the table is a guide-board 27 for guarding against dislodgment of the entrails passing with the belt.

Located over each series of knives is a water-spray pipe $28^a$ for keeping the cutting edges clean, and a similar pipe 29 may be arranged across the discharge end of the belt for cleansing the latter.

Having thus described our invention, what we claim as new therein, and desire to secure by Letters Patent, is—

1. In a machine for the purpose described, the combination of a traveling belt or carrier, a series of rotary cutters arranged across said belt and under the edge of each of which cutters the belt projects and means for supporting the upper fold of the belt on each side of said series of cutters immediately contiguous thereto, said upper fold of the belt being unsupported and depressible directly under said cutters, substantially as set forth.

2. In a machine for the purpose described the combination of a traveling belt or carrier and two series of rotary cutters arranged thereacross and the cutters of one series staggered with reference to those of the other series, substantially as set forth.

3. In a machine for the purpose described, the combination of a traveling belt or carrier, a series of rotary cutters arranged thereacross and normally slightly above the plane of the upper fold thereof so as not to touch the belt, and means for supporting the belt immediately contiguous to each side of said cutters, said belt being unsupported and depressible directly under said cutters, substantially as set forth.

JOHN W. KOHLHEPP.
ALBERT J. FRANCIS.

Witnesses:
EDNA B. JOHNSON,
JNO. G. ELLIOTT.